United States Patent [19]

Meermoller

[11] Patent Number: 4,846,108
[45] Date of Patent: Jul. 11, 1989

[54] TEAT CUP FOR MILKING SYSTEMS

[75] Inventor: Theodor Meermoller, Oelde, Fed. Rep. of Germany

[73] Assignee: Westfalia Separator AG, Oelde, Fed. Rep. of Germany

[21] Appl. No.: 74,588

[22] Filed: Jul. 17, 1987

[30] Foreign Application Priority Data

Jul. 19, 1986 [DE] Fed. Rep. of Germany ....... 3624478

[51] Int. Cl.$^4$ ................................................. A01J 5/04
[52] U.S. Cl. .................................................. 119/14.47
[58] Field of Search .............. 119/14.47, 14.48, 14.49, 119/14.5, 14.51, 14.52, 14.53

[56] References Cited

U.S. PATENT DOCUMENTS 1,641,316  9/1927  Bruun ........................... 119/14.47 X
4,481,906  11/1984  Steingraber et al. ........ 119/14.47 X

FOREIGN PATENT DOCUMENTS 104687   8/1938  Australia ........................ 119/14.49
124033   5/1947  Australia ........................ 119/14.53
1106329  3/1968  United Kingdom ............. 119/14.47

*Primary Examiner*—Robert P. Swiatek
*Attorney, Agent, or Firm*—Sprung Horn Kramer & Woods

[57] ABSTRACT

A spreader is provided to avoid impermissibly high pressures in the interior of the inner sheath of a teat cup with a valve. The spreader powerfully decreases the pressure in the interior during the non-suction phase and accordingly compensates for the pressure increase resulting from the prestress of the inner sheath during the suction phase when the valve is closed.

6 Claims, 2 Drawing Sheets

TEAT CUP FOR MILKING SYSTEMS

BACKGROUND OF THE INVENTION

The present invention relates to a teat cup for milking systems, with an outer sheath that surrounds an inner sheath, leaving between them a pulsation space that is alternately subjected to vacuum and to atmospheric pressure, whereby the interior of the inner sheath communicates with a vacuumized line and a valve automatically prevents flow from the line into the interior of the inner sheath.

Teat cups of this type are known. The valve is a check valve and is positioned either on the cup or in the line, which leads from the interior of the inner sheath to a milk-removal line. The valve is intended to prevent milk that has already been extracted from the udder from flowing back into the inner sheath, where it might lead to infection of the teat.

Although the valve in the known cup does prevent backflow, it also involves the drawback of leading to too powerful a vacuum below the teat during the suction phase of the milking process. This vacuum is generated by the inner sheath itself when the valve is closed, and is more powerful than the operating pressure prevailing inside the inner sheath. During the non-suction phase, the inner sheath is compressed by the atmospheric pressure in the pulsation space, for which the tensional force on the part of the inner sheath must be overcome. During the subsequent suction phase, when the inner sheath is expanded, the valve closes subject to the resulting backflow, which happens before the cross-section of the sheath is completely open. Since the interior of the inner sheath has been subjected to operating vacuum before the valve closes, the sheath will, as it continues to expand once the valve has closed, increase the vacuum in its interior even more. The extent that the vacuum increases to can vary widely, depending on the age and flexibility of the inner sheath, and can be impermissibly high. Furthermore, the vacuum below the teat during the non-suction phase may not, commencing from a very high level during the suction phase, decrease adequately. This can eventually lead to evagination of the udder stroke channel and other serious udder problems.

SUMMARY OF THE INVENTION

The object of the present invention is to improve the known teat cup in order to prevent excessive increases in the pressure inside the inner sheath during the suction phase.

This object is attained in accordance with the invention by the improvement wherein a spreader that is in itself known and that has a bore extending through it, that can be closed off by the inner sheath is positioned between the valve and the inner sheath.

A spreader of this type is known, from German AS No. 1 296 867 for example. Its effect is to decrease the vacuum inside the inner sheath during the non-suction phase to the level just necessary to keep the cup attached to the teat. With this level of vacuum, which is considerably weaker than that of the operating vacuum, as a point of departure, the vacuum increase generated by the inner sheath itself during the suction phase is compensated for and the aforesaid drawback eliminated.

The spreader and the valve in one practical embodiment of the invention have a common housing. This embodiment is especially compact and cost-effective.

The housing is preferably made out of a transparent material, allowing both the milk flow and valve function to be easily monitored.

The housing in one practical embodiment can be taken apart to facilitate maintenance.

The valve can employ either a ball or a flap. Both mechanisms are cost-effective.

Some preferred embodiments of the invention will now be specified with reference to the attached drawings, wherein

DETAILED DESCRIPTION OF THE PREFERRED EMBODIMENTS

Figure 1:
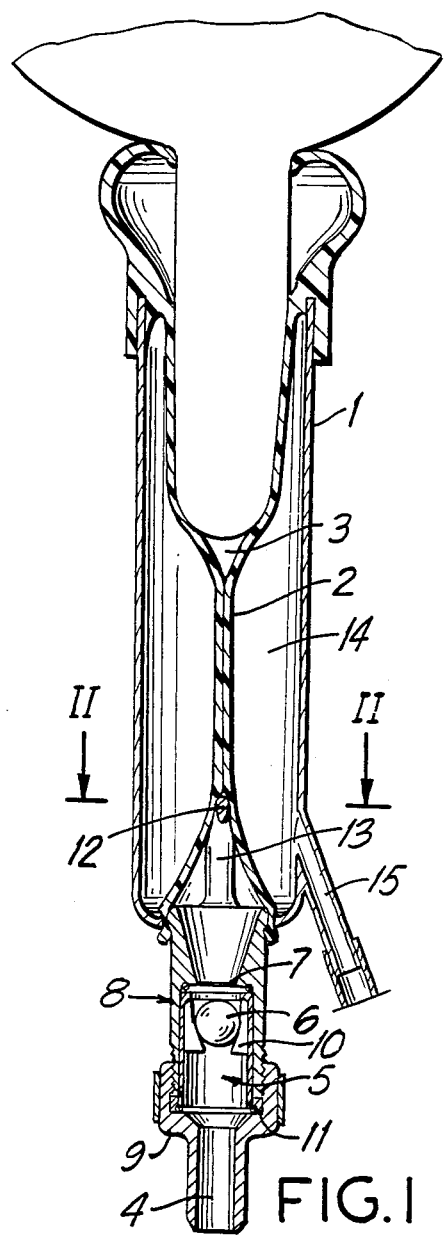
FIG. 1 is a vertical section through a teat cup according to the present invention with a ball-type valve.

The teat cup illustrated in FIG. 1 has an outer sheath 1 that surrounds an inner sheath 2, leaving a pulsation space 14 between them. The interior 3 of inner sheath 2 can be connected to an unillustrated milk-removal line through a connection 4. Between connection 4 and the interior 3 of inner sheath 2 is a valve 5. Valve 5 comprises a ball 6 and a seat 7 and is accommodated in a housing 8. Housing 8 has a removable cap 9. Ball 6 is positioned by the ribs 10 inside a replaceable insert 11. A spreader 12 is mounted on housing 8. The junction of outer sheath 1 and inner sheath 2 is stretched over the top of housing 8. Spreader 12 is shaped like an inverted raindrop and has a bore 13 extending through it. Bore 13 is closed off by inner sheath 2 during the non-suction phase of the milking process. Pulsation space 14 can be alternately subjected to vacuum and to atmospheric pressure through a connection 15 to outer sheath 1.

Figure 2:
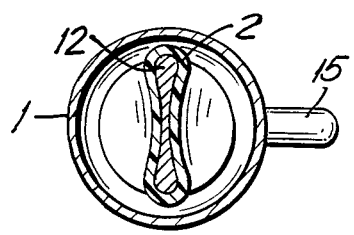
FIG. 2 is a horizontal section through the teat cup illustrated in FIG. 1.

FIGS. 1 and 2 show inner sheath 2 during the non-suction phase, when atmospheric pressure prevails in pulsation space 14 and valve 5 is open, establishing an operating vacuum below spreader 12. Since, however the bore 13 through spreader 12 is closed off by inner sheath 2, the vacuum directly below the teat can decrease to a residual level due to system-dictated leakage in the channel. When, accordingly, pulsation space 14 is subjected to vacuum, inner sheath 2 will expand and release bore 13, connecting the interior 3 of inner sheath 2 to the operating vacuum prevailing at connection 4. Since the pressure in interior 3 is higher than the pressure at connection 4, air will initially flow from interior 3 to connection 4. Additional expansion of inner sheath 2 will, however, reverse the direction of flow once the pressures are equal, and the air will then flow from connection 4 into interior 3, forcing ball 6 against seat 7 and preventing further flow of air and liquid. The continued expansion of inner sheath 2 can therefore result in only a negligible increase in the pressure above operating vacuum in interior 3.

Figure 3:
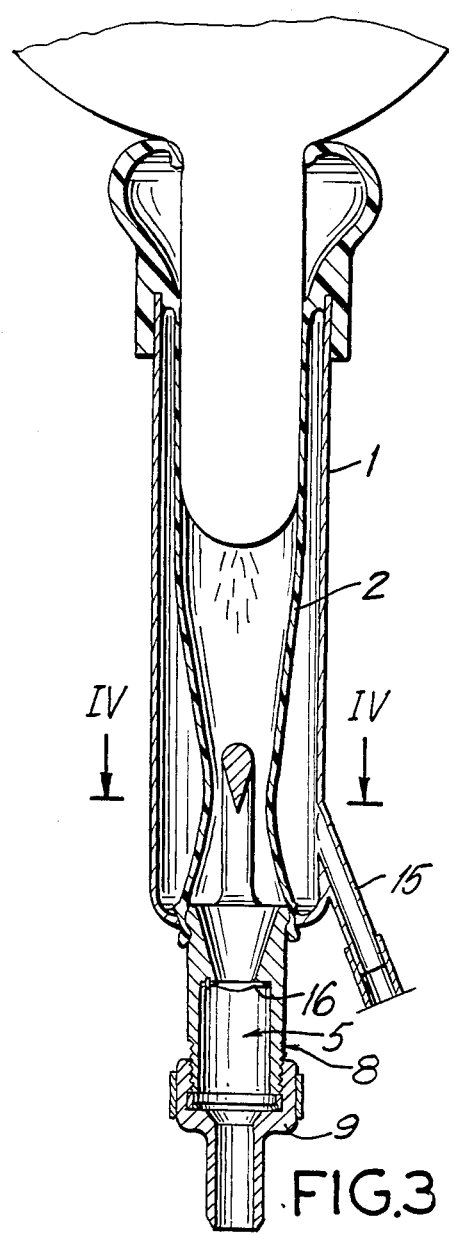
FIG. 3 is a vertical section through a teat cup according to the present invention with a flap-type valve.
Figure 4:
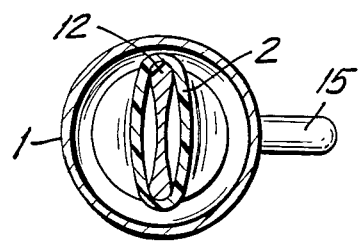
FIG. 4 is a horizontal section through the teat cup illustrated in FIG. 3.

FIGS. 3 and 4 show inner sheath 2 during the suction phase immediate after valve 5 has closed. This particular valve employs a flap 16.

Figure 5:
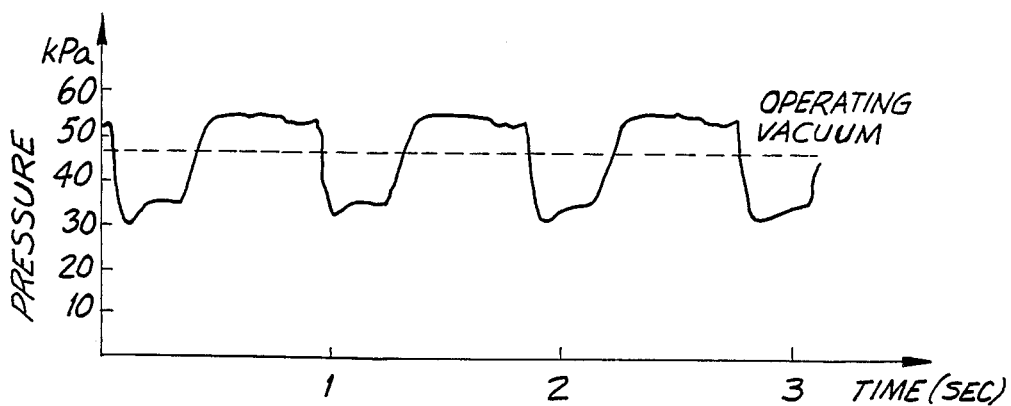
FIG. 5 is graph of the vacuum inside the inner sheath of a known teat cup with a valve, as a function of time.
Figure 6:
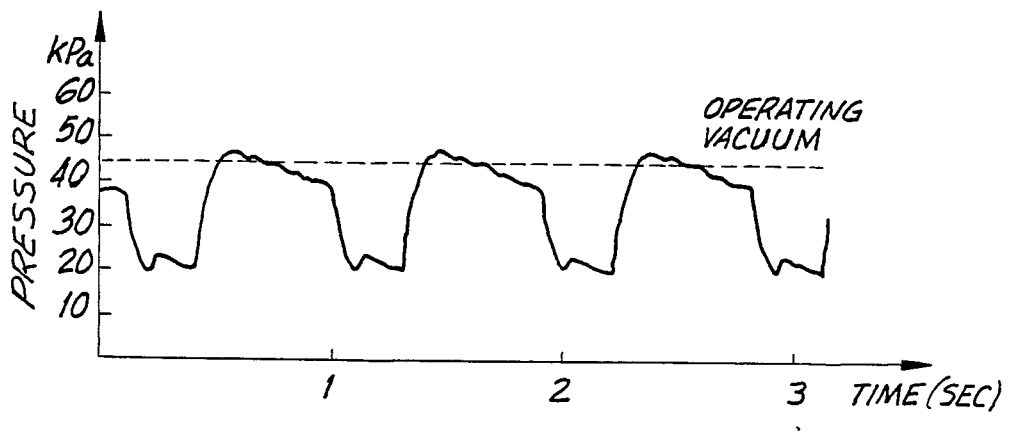
FIG. 6 is graph of the vacuum inside the inner sheath of a teat cup in accordance with the invention with both a valve and a spreader, as a function of time.

The difference in pressure activities in the interior 3 of inner sheath 2 will be especially evident from FIGS. 5 and 6. These values, which were obtained empirically, show that the operating vacuum is considerably exceeded during the suction phase in a known teat cup without a spreader and that a relatively high vacuum is maintained even during the non-suction phase (FIG. 5). The pressure situation is on the other hand essentially more desirable in a teat cup in accordance with the invention.

It will be appreciated that the instant specification and claims are set forth by way of illustration and not limitation, and that various modifications and changes may be made without departing from the spirit and scope of the present invention.

What is claimed is:

1. In a teat cup for a milking system, having an outer sheath surrounding an inner sheath to form a pulsation space therebetween, means for alternately subjecting the pulsation space to vacuum and to atmospheric pressure during milking, wherein the interior of the inner sheath communicates with an outlet connectable to a vacuumized line, the improvement comprising: a valve between the outlet and inner sheath which is open when the pulsation space is at atmospheric pressure and closed when the pulsation space is subjected to a vacuum to automatically prevent flow from the line into the interior of the inner sheath, and a spreader positioned between the valve and the inner sheath and having a bore extending through the spreader and configured to be closed off by the inner sheath when the pulsation space is subjected to atmospheric pressure.

2. The teat cup as in claim 1, wherein the spreader and the valve have a common housing.

3. The teat cup as in claim 2, wherein the housing is composed of a transparent material.

4. The teat cup as in claim 2, wherein the housing is disassembled.

5. The teat cup as in claim 1, wherein the valve comprises a ball.

6. The teat cup as in claim 1, wherein the valve comprises a flap.

* * * * *